United States Patent
Gassion et al.

(10) Patent No.: US 9,642,111 B2
(45) Date of Patent: May 2, 2017

(54) METHOD AND SYSTEM FOR COMMUNICATING BETWEEN A FIRST ITEM OF EQUIPMENT AND ONE OR MORE OTHER ITEMS OF EQUIPMENT

(75) Inventors: Romain Gassion, Izeaux (FR); Thierry Chiche, St Ismier (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 197 days.

(21) Appl. No.: 13/979,950

(22) PCT Filed: Jan. 27, 2012

(86) PCT No.: PCT/EP2012/051282
§ 371 (c)(1),
(2), (4) Date: Jul. 16, 2013

(87) PCT Pub. No.: WO2012/116861
PCT Pub. Date: Sep. 7, 2012

(65) Prior Publication Data
US 2013/0304859 A1    Nov. 14, 2013

(30) Foreign Application Priority Data
Feb. 28, 2011 (FR) .................................. 11 51596

(51) Int. Cl.
*G06F 15/16* (2006.01)
*H04W 64/00* (2009.01)
(Continued)

(52) U.S. Cl.
CPC ......... *H04W 64/003* (2013.01); *H04L 12/281* (2013.01); *H04L 61/20* (2013.01);
(Continued)

(58) Field of Classification Search
CPC ........ H04L 67/16; H04L 67/18; H04L 61/609
(Continued)

(56) References Cited

U.S. PATENT DOCUMENTS

| | | | | |
|---|---|---|---|---|
| 4,939,726 A | * | 7/1990 | Flammer ................ | H04L 45/00 370/400 |
| 5,115,433 A | * | 5/1992 | Baran ..................... | H04L 45/04 370/400 |

(Continued)

OTHER PUBLICATIONS

Imielinski J. et al, "GPS-Based Addressing and Routing", Network Working Group Request for Comments: 2009 Category: Experimental, pp. 1-28, (Nov. 1996), XP015007793.
(Continued)

*Primary Examiner* — Imad Hussain
(74) *Attorney, Agent, or Firm* — Oblon, McClelland, Maier & Neustadt, L.L.P.

(57) ABSTRACT

A method and system for communicating between a first item of equipment and one or more other items of destination equipment implemented through a communication network, each item of equipment being identified on the communication network via an identifier based on its geographical coordinates. The method includes dispatching a message via the first item of equipment to each destination item of equipment, the message being in accordance with a determined communication protocol and including a first item of information defining a zone of influence corresponding to a determined geographical zone with respect to which each item of destination equipment determines whether the message is relevant to it.

14 Claims, 2 Drawing Sheets

(51) Int. Cl.
*H04L 12/28* (2006.01)
*H04L 29/12* (2006.01)
*H04W 8/00* (2009.01)
*H04L 29/08* (2006.01)

(52) U.S. Cl.
CPC ............ *H04L 61/60* (2013.01); *H04L 61/609* (2013.01); *H04L 67/16* (2013.01); *H04L 67/18* (2013.01); *H04W 8/005* (2013.01)

(58) Field of Classification Search
USPC ....... 713/150; 340/539.13, 686.6; 455/435.1; 709/217
See application file for complete search history.

(56) References Cited

U.S. PATENT DOCUMENTS

| | | | | |
|---|---|---|---|---|
| 5,400,338 | A * | 3/1995 | Flammer, III | .... H04L 29/12311 370/255 |
| 5,488,608 | A * | 1/1996 | Flammer, III | .......... H04L 45/00 370/400 |
| 6,829,230 | B1 * | 12/2004 | Tiuri | ................. H04L 29/12216 370/351 |
| 7,382,271 | B2 * | 6/2008 | McFarland | ............ G05B 15/02 340/539.2 |
| 2003/0023747 | A1 * | 1/2003 | Fouquet | ............ H04L 29/12311 709/238 |
| 2003/0128987 | A1 * | 7/2003 | Mayer | ................ H04Q 11/0062 398/98 |
| 2004/0081153 | A1 * | 4/2004 | Mayer | ................ H04Q 11/0005 370/392 |
| 2005/0080925 | A1 * | 4/2005 | Staiger | .................... H04L 45/12 709/239 |
| 2008/0145050 | A1 * | 6/2008 | Mayer | ................ H04J 14/0227 398/49 |
| 2008/0146225 | A1 * | 6/2008 | Stuart | ................ H04L 29/1232 455/435.1 |
| 2011/0037590 | A1 * | 2/2011 | Kannan | ................ G08B 27/005 340/539.13 |
| 2011/0154014 | A1 * | 6/2011 | Thorn | ................ H04M 1/7253 713/150 |

OTHER PUBLICATIONS

International Search Report Issued Oct. 2, 2012 in PCT/EP12/051282 Filed Jan. 27, 2012.

* cited by examiner

METHOD AND SYSTEM FOR COMMUNICATING BETWEEN A FIRST ITEM OF EQUIPMENT AND ONE OR MORE OTHER ITEMS OF EQUIPMENT

The present invention relates to a method and system for communication between a first device and one or more other devices. The invention also relates to a device employed in this communication system.

For certain applications, such as, for example, the control of lights, it is increasingly common to use wireless technologies. Lights can be controlled via a wireless link by virtue of a transmitter that communicates with a receiver equipped with an output for the transmission of a turn-on signal to a light. To communicate, the transmitter must be known to the receiver. A method for coupling the transmitter and the receiver must therefore be implemented before normal use of the transmitter/receiver assembly. If a given transmitter is associated with a number of receivers, for example in order to control a number of lights, each receiver must be coupled to the transmitter. Prior-art solutions are unsatisfactory because they all require a specific coupling procedure to be implemented—each additional receiver must be coupled to the transmitter.

A protocol allowing a message to be transmitted to a number of devices at the same time via definition of a geographical zone in which said devices are located is known from the publication by T. Imielinski and J. Navas, entitled "GPS-Based Addressing and Routing". The message is directed to all the devices located in a zone defined by geographical coordinates. This solution thus makes it easy to transmit a message to a number of devices at the same time, without the individual IP address of each of the devices being known.

In this publication, geographical coordinates are used to define an emission zone for a message. However, the message is transmitted in the context of a network employing an IP (Internet protocol) protocol, and therefore it is not possible to communicate with a device directly without knowing its IP address. In addition, when a device is replaced, the IP address of the new device must be parameterized in order for this device to be recognized by the network.

The aim of the invention is to provide a method and system for communication between a first device and one or more other devices in which no specific coupling procedure must be carried out, and which allows each device to be easily addressed. The aim of the invention is also to provide a device employed in this communication method and system.

This aim is achieved by a method of communication between a first device and one or more other destination devices, implemented via a communication network, each device being identified in said communication network by an identifier based on its geographical coordinates, the method comprising a step in which the first device transmits a message to each destination device, said message conforming to a given communication protocol and comprising a first piece of information defining a zone of influence corresponding to a given geographical zone with respect to which each destination device determines whether it is concerned by said message.

According to the invention, each device is thus identified in the network by an identifier based on its geographical coordinates. In this way, this identifier is automatically parameterized in the device thereby allowing it to connect automatically to the network, without configuration. In addition, if its geographical position changes, the device automatically updates its identifier taking account of its new geographical position. Lastly, when a device is replaced, the new device is automatically allocated the same identifier, in a way that is transparent to the other devices in the network.

According to one particularity, the zone of influence is parameterized by its shape and size.

According to another particularity, the first piece of information comprises a data item relating to a positional uncertainty with respect to the zone of influence.

According to another particularity, the first piece of information in the message comprises a data item relating to an orientation of a device with respect to the zone of influence.

According to another particularity, the message comprises a second piece of information relating to a given point in space with respect to which each device to which a message is directed determines whether it is concerned by said message.

According to another particularity, the message comprises a third piece of information corresponding to an angular deviation with respect to orientations pointing to the given point in space.

According to another particularity, the communication protocol comprises a function for discovering the devices present in the zone of influence.

The invention also relates to a communication system comprising a first device and one or more other destination devices connected in a communication network, each device being identified in said communication network by an identifier based on its geographical coordinates, the communication system employing a communication protocol to define a message transmitted by the first device to one or more destination devices, said message comprising a first piece of information defining a zone of influence corresponding to a given geographical zone with respect to which each destination device determines whether it is concerned by said message. This system is in particular perfect for implementing the method described above.

According to one particularity, the identifier of each device comprises a piece of information corresponding to the type of device.

According to another particularity, the first device comprises means for configuring its zone of influence. These configuring means for example comprise human machine interface means located on the device or that can be connected to the device.

According to another particularity, the zone of influence is parameterized by its shape and size.

Other features and advantages will become apparent from the following detailed description which refers to an embodiment given by way of example and illustrated by the appended drawings in which.

Figure 1:
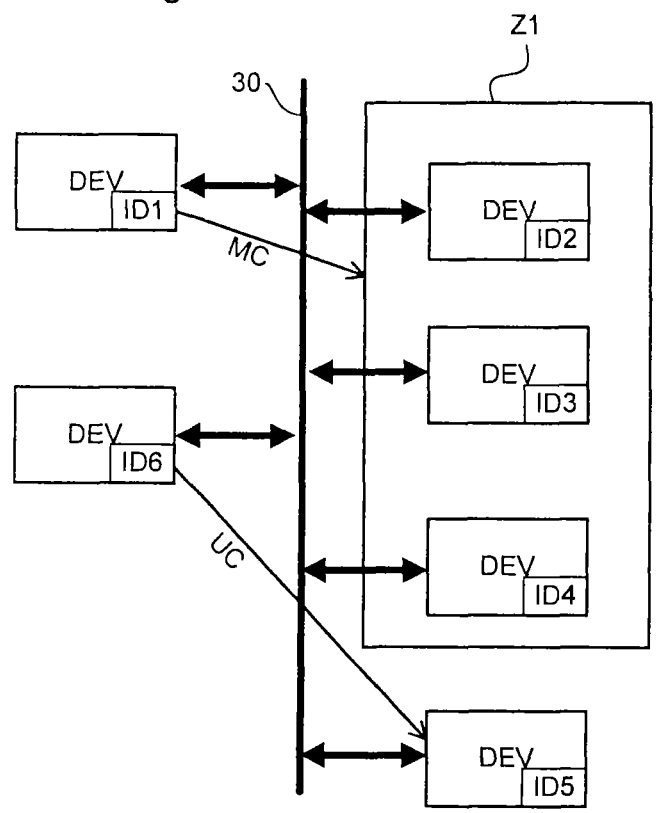
FIG. 1 shows a communication system according to the invention, comprising a message transmitting first device and a number of other devices to which the messages are directed.

The invention relates to a communication system comprising a number of devices DEV communicating together via a communication network 30, each device employing an identifier ID1, ID2, ID3, ID4, ID5, ID6 (denoted ID below) allowing them to be identified in the communication network 30. The communication system will for example employ a wired or wireless communication network.

In the following description, the term "device" will be used to denote a message transmitting device, a message receiving device or a device that transmits/receives messages. In the rest of the description it should also be borne in mind that a device may comprise a number of distributed elements such as, for example, an electromechanical contactor housed in an enclosure and an electric motor. In addition, if a number of devices comprise a common element, each pair comprising the common element may be considered as a separate device. This will, for example, be the case for an electromechanical contactor intended to control a number of electrical motors.

According to the invention, each device DEV is identified on the communication network 30 by its geographical coordinates. Thus, when a device DEV is added to the communication network 30, it determines its identifier ID based on its geographical coordinates. Any communication between devices DEV over the communication network 30 relies on these geographical-coordinate-based identifiers ID. When the device comprises a number of distributed elements, its geographical coordinates will be those of one of its elements, i.e., for example, those of the electrical motor and not those of the contactor that allows this electrical motor to be controlled.

According to the invention, a specific communication protocol allows the devices DEV to communicate over the communication network 30. This communication protocol is a network protocol that can be implemented by way of a new protocol or added to protocols, for example IP, ZIGBEE, LON, on existing networks.

According to the invention, the identifier ID of a device DEV in the communication network 30 is composed of three separate pieces of information:

its reference geographical position, denoted DevPos (DevX, DevY, DevZ);
the type of device, denoted DevType; and
a device number, denoted DevInst.

The reference geographical position DevPos corresponds to the physical position of the device. It may be determined using a GPS chip embedded in the device or parameterized using an external piece of equipment connected to the device. Of course, any other solution allowing the geographical position of the device to be detected may be employed.

The piece of information DevType regarding the type of device allows devices in the network to be differentiated from one another, for example different types of receiver devices with respect to a common transmitter device. A temperature sensor is different from a motion sensor or a light.

The device number DevInst for its part allows devices of the same type connected to the network and possessing the same reference geographical position to be uniquely differentiated. For a device not connected to a network, or when the device number has not yet been allocated, this device number is set by default to the value zero.

The complete identifier, denoted ID, is thus formulated in the following way:

ID=DevPos(DevX, Devy, DevZ), DevType, DevInst

Moreover, each device connected to the communication network possesses certain properties allowing it to remain up-to-date on the communication network 30. These properties are stored in the memory of the device and are the following:

its current geographical position, denoted CurPos (CurX, CurY, CurZ);

the length of time since its identifier was last updated, denoted IDAssignTime; and
the accuracy of its geographical position, denoted LocAcc.

The current position CurPos of the device corresponds to the last geographical position detected or input for the device. During initialization of a device DEV, its current position CurPos is by default its reference position DevPos.

Each device DEV stores in its memory a parameter describing the uncertainty in its position, denoted LocAcc. This parameterizable piece of information is used to determine whether the reference position DevPos of the device needs to be updated when the current position CurPos of the device DEV changes. If the difference between the reference geographical position DevPos and the current geographical position CurPos is greater than the positional uncertainty, then the reference geographical position DevPos must be reset and replaced by the current geographical position CurPos, causing the identifier ID of the device DEV to be modified.

Thus, according to the invention, each device may be easily allotted a modifiable address that depends on its geographical position. If a device stops working and must be replaced, the new device, installed in the same geographical position, gets the same identifier. In this way, the replacement of the device is transparent to the other devices in the network and no additional configuration is required. Likewise, moving a device from one place to another automatically causes its identifier to change so that it is treated by the network as a new device.

Provided its identifier ID and its properties, a device DEV may communicate with another device DEV over the communication network 30 using messages according to the communication protocol of the invention.

There are two types of messages, what are called "unicast" messages (UC, FIG. 1) and what are called "multicast" messages (MC, FIG. 1).

Unicast messages are messages transmitted by a device DEV for the attention of a single other destination device DEV. Unicast messages have the following form: <ID><ID><MessID><Mess>.

In which:
ID corresponds to the identifier of the device transmitting the message;
ID corresponds to the identifier of the destination device of the message;
MessID corresponds to the type of message; and
Mess corresponds to the body of the message.

FIG. 1 illustrates the transmission of a unicast message (UC), by a transmitter device for the attention of a single destination receiver device known to the transmitter device, via the communication network 30.

Multicast messages (MC) are messages transmitted by a device DEV for the attention of one or more destination devices DEV that are not specifically addressed. According to the invention, this type of message allows devices located in a given zone of influence, which zone of influence can be parameterized on the device transmitting the message, to be addressed. Multicast messages have the following form:
<ID><AREA><MessID><Mess>
In which:
ID corresponds to the identifier of the transmitting device;
AREA defines a zone of influence Z1 of the transmitting device;
MessID corresponds to the message type; and
Mess corresponds to the body of the message.

More precisely, the piece of information AREA corresponds to the zone of influence Z1 (FIG. 1) of the device transmitting the message and defines a geometrical shape type, denoted TypZ, and geographical coordinates, denoted CoordZ, of the geometrical shape. The geometrical shape type TypZ may have various attributes and may, for example, be the entire universe or any known three-dimensional geometrical shape such as a sphere, cone, cylinder or even a particular point in space if the aim is to locate devices having same geographical coordinates. The piece of information AREA may, for example, also comprise a data item denoted Alea relating to a distance uncertainty regarding the geographical position of a destination device with respect to the geometric shape.

Using multicast messages, a first device can thus address one or more other devices in a given zone of influence Z1 corresponding to a geographical zone parameterized in the first device. This zone of influence Z1 will for example be a room of a building. A device DEV will be concerned by the message if its current or reference geographical position is located in the zone of influence of the transmitting device. A device transmitting a message will thus be able to limit its communication to destination devices of a certain type present in a given geographical zone defined by its zone of influence Z1. Destination devices that do not meet these criteria will not take part in the communication. FIG. 1 illustrates the principle of the invention, by way of which an transmitting device is able to communicate, over the communication network 30, with destination devices the current or reference geographical position of which is located in its zone of influence Z1. Destination devices that are not located in the geographical zone Z1 are not concerned by the multicast messages transmitted by the message transmitting device.

In the rest of the description, it should be understood that the geographical position with respect to which a device to which a message is directed decides whether it is concerned by the message may be the reference geographical position DevPos or the current geographical position CurPos. Both solutions may be envisioned.

According to one variant embodiment of the invention, the identifier of the device DEV may also comprise a piece of information relating to its orientation in space. The term "orientation" is understood to mean a direction and a sense, i.e. that the orientation may be represented by a vector. In this case, the identifier ID of the device then comprises four pieces of information in total, i.e.:

its reference geographical position, denoted DevPos (DevX, DevY, DevZ);
its reference orientation, denoted DevOri (DevPsi, DevPhy, DevTheta);
the type of device, denoted DevType; and
a device number, denoted DevInst.

The pieces of information DevPos, DevType, and DevInst are identical to those defined above. The piece of information DevOri corresponds, for its part, to the reference orientation of the device and therefore takes the form of a vector having a direction and a sense. The orientation is for example determined using an internal gyroscope located inside the device or parameterized using an external piece of equipment connected to the device. Of course, any other solution allowing the orientation of the device to be detected may be employed. The three components of the reference orientation, denoted DevPsi, DevPhy, DevTheta, are Euler angles and respectively define azimuth, elevation and yaw. According to this variant embodiment, the complete identifier ID is then formulated in the following way:

ID=DevPos(DevX, Devy, DevZ), DevOri(DevPsi, DevPhy, DevTheta), DevType, DevInst

As this variant embodiment takes the orientation of the device into account, the properties of the device are also modified. In addition to properties relating to its current geographical position CurPos, to the length of time since its identifier was last updated, denoted IDAssignTime, and to the accuracy of its position, denoted LocAcc, which were described above, properties of the device comprise the current orientation, denoted CurOri, and the accuracy of the orientation, denoted OriAcc.

The current orientation CurOri, comprises data items CurPsi, CurPhy, CurTheta, which correspond to current angles. The current orientation CurOri corresponds to the last geographical orientation detected or input for the device. During initialization of a device, its current orientation CurOri is by default its reference orientation DevOri.

Each device 10, 20 also stores, in its memory, a parameter describing the uncertainty in its orientation, denoted OriAcc. This parameterizable piece of information is employed to determine whether the reference orientation DevOri of the device must be updated when the current orientation CurOri of the device changes. If the difference between the reference geographical orientation DevOri and the current geographical orientation CurOri is greater than the orientational uncertainty OriAcc, then the reference orientation DevOri must be reset and replaced by the current geographical orientation CurOri, causing the identifier ID of the device DEV to be modified.

With this new identifier ID incorporating the reference orientation of the device, messages of the unicast type and messages of the multicast type are modified.

Unicast messages still have the form <ID><ID><MessID><Mess>. However the identifier of the transmitting device and the identifier of the destination device take the form:

ID=DevPos(DevX, Devy, DevZ), DevOri(DevPsi, DevPhy, DevTheta), DevType, DevInst

They therefore incorporate the notion of reference orientation.

As regards multicast messages, the incorporation of the notion of orientation requires various message types to be defined, denoted "multicast1", "multicast2" and "multicast3".

As for the multicast messages described above, these messages also incorporate the notion of zone of influence, denoted Z1. In addition to the data item relating to the geometrical shape, and denoted TypZ, and the data item relating to the coordinates of the geometrical shape, and denoted CoordZ, of the zone of influence Z1, the piece of information AREA incorporates a data item denoted AleaZ, corresponding to a positional uncertainty of the device, depending on the reference or current orientation of the device, and a data item denoted TreatZ corresponding to the way in which the position of the device and its positional uncertainty must be interpreted with respect to the zone of influence Z1 defined by TypZ and CoordZ.

The multicast1 message makes it possible to target any device that meets criteria contained in the piece of information AREA defined above. The table below defines, for example, for each value of the data item TreatZ contained in this piece of information AREA, the devices concerned by the multicast1 message received.

| TreatZ | DEV1 | DEV2 | DEV3 | DEV4 |
|---|---|---|---|---|
| 0 | N | N | N | N |
| 1 | N | Y | N | N |
| 2 | N | Y | N | Y |
| 3 | N | Y | Y | N |
| 4 | N | Y | Y | Y |
| 5 | Y | N | N | N |
| 6 | Y | N | Y | N |
| 7 | Y | N | N | Y |
| 8 | Y | N | Y | Y |
| 9 | Y | Y | Y | Y |

In this table, the headings DEV1, DEV2, DEV3, DEV4 correspond to the four possible situations (FIG. 2) in which a device may find itself with respect to a zone of influence Z1 defined by TypZ and CoordZ Depending on its situation and the value of the data item TreatZ, the device will either be concerned by the message (letter "Y" in the table) or not concerned by the message (letter "N" in the table). Specifically, the situation of each device may be represented by a reference point corresponding to its reference or current geographical position, and a vector (V1, V2, V3, V4), having said reference point as its origin, oriented with the reference or current orientation of the device, and having a norm equal to the value defined in the data item AleaZ of the piece of information AREA. This vector is for example called the "uncertainty vector". In the rest of the description, it should be understood that the orientation with which a device to which a message is directed decides whether it is concerned by the message may be its reference orientation DevOri or its current orientation CurOri. Both solutions may in fact be envisioned.

Figure 2:
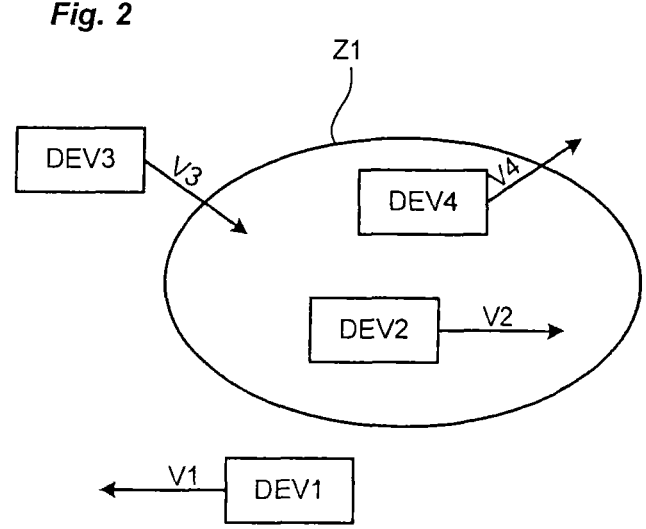
FIG. 2 shows the principle of selection of devices with respect to a zone of influence.

With reference to FIG. 2, there are thus four possible situations:
  a device (DEV2) may comprise a reference or current geographical position located inside the zone of influence and an uncertainty vector V2 located inside the zone of influence Z1;
  a device (DEV4) may comprise a reference or current geographical position located inside the zone of influence and an uncertainty vector V4 pointing out of the zone of influence Z1;
  a device (DEV3) may comprise a reference or current geographical position located outside of the zone of influence but have an uncertainty vector V3 pointing into the zone of influence Z1; and
  a device (DEV1) may comprise a reference or current geographical position located outside of the zone of influence and have an uncertainty vector V1 pointing out of the zone of influence Z1.

A destination device located in the zone of influence Z1 defined by the transmitting device in its multicast1 message will possibly not be concerned by this message if its situation is such that it does not meet the criteria of the TreatZ variable defined in the piece of information AREA.

The multicast1 message therefore takes the following form:
  <ID><AREA><MessID><Mess>
  In which:
  ID corresponds to the identifier of the transmitting device;
  AREA defines the zone of influence Z1 of the transmitting device and the data item AleaZ and the data item TreatZ;
  MessID corresponds to the message type; and
  Mess corresponds to the body of the message.

The multicast2 message allows devices meeting criteria contained in the piece of information AREA to be targeted in more detail. Specifically, this message allows devices that have a reference or current orientation that is identical, to within an angular uncertainty, to a given orientation defined in the message, to be targeted. This multicast2 message therefore takes the following form:
  <ID><AREA><OriDet><AngDet><MessID><Mess>
  In which:
  ID corresponds to the identifier of the transmitting device;
  AREA defines a zone of influence Z1 of the transmitting device and the data item AleaZ and the data item TreatZ;
  OriDet corresponds to a given orientation and comprises the data items Phy, Psi, Theta;
  AngDet defines an angular uncertainty in the given orientation defined by OriDet,
  MessID corresponds to the type of message; and
  Mess corresponds to the body of the message.

Figure 3:
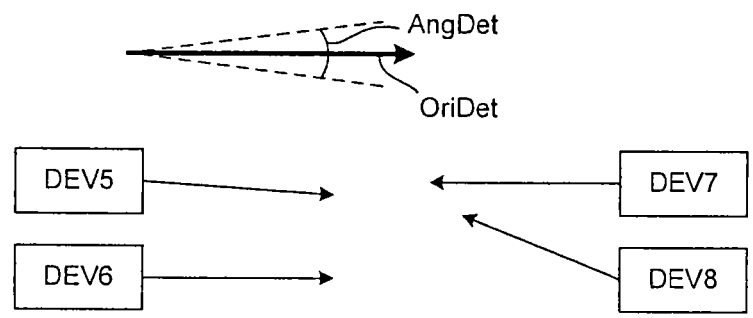
FIGS. 3, 4 and 5 illustrate the operating principles of "multicast1", "multicast2" and "multicast3" messages.

Thus, FIG. 3 shows a vector defining a given orientation OriDet and an uncertainty AngDet in this orientation. Devices the reference orientation DevOri or current orientation CurOri of which is aligned with the given orientation, to within the angular uncertainty, are concerned by the message, provided that they meet the other criteria, especially regarding their position with respect to the zone of influence Z1. In FIG. 3, the devices denoted DEV5 and DEV6 are concerned but not the devices DEV7 and DEV8.

The multicast3 message allows devices that have an orientation defined, to within an angular uncertainty, with respect to a given point in space and to within an angular deviation with respect to this point, to be targeted. This multicast3 message therefore takes the following form:
  <ID><AREA><PtDet><AngDet><AngDev><MessID><Mess>
  In which:
  ID corresponds to the identifier of the transmitting device;
  AREA defines the zone of influence Z1 of the transmitting device and the data item AleaZ and the data item TreatZ;
  PtDet corresponds to a given point in space and comprises geographical coordinates (X, Y, Z);
  AngDet defines an angular uncertainty in the reference orientation DevOri of the device;
  AngDev corresponds to an angle of deviation with respect to the direction pointing toward the given point;
  MessID corresponds to the type of message; and
  Mess corresponds to the body of the message.

Figure 4:
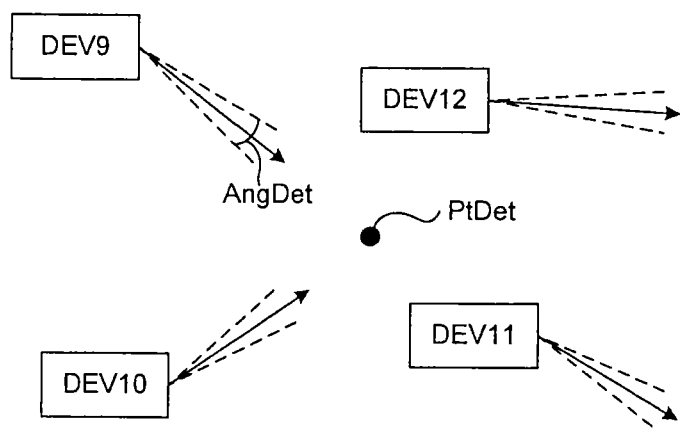
Figure 5:
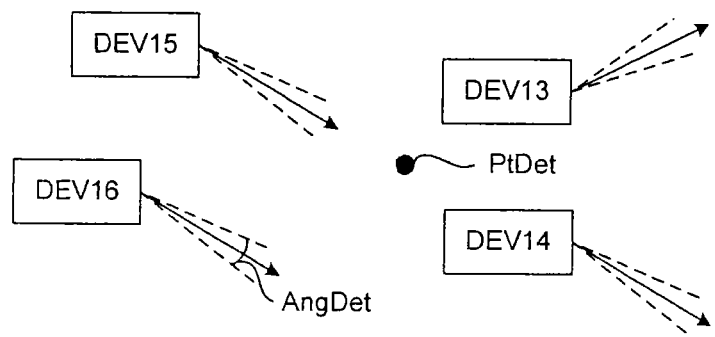

Thus, FIG. 4 shows a given point PtDet and a number of devices oriented with respect to this point. The devices the reference orientation DevOri or current orientation CurOri of which points toward the given point PtDet, to within the angular uncertainty, after adjustment for the angle of deviation AngDev, are concerned by the message provided that they meet the other criteria, especially regarding their position relative to the zone of influence. In FIG. 4 the devices denoted DEV9 and DEV10 are concerned but not the devices DEV11 and DEV12. In FIG. 4, the angular deviation is set to 0 degree, meaning that the message concerns devices pointing toward the given point. In FIG. 5, the angle of deviation is set to 180 degrees, meaning that the message is directed to any device the reference or current orientation of which makes an angle of 180 degrees to the orientation pointing toward the given point. In FIG. 5 devices DEV13 and DEV14 are therefore concerned but not devices DEV15 and DEV16.

In accordance with the communication protocol of the invention, listed below are various messages that can be exchanged between two devices connected to the communication network. The messages may be what are called "system" messages relating to the configuration of the communication system or what are called "application" messages relating to the operation of the communication system.

The following are examples of "system" messages:
Discovery_Request, which allows a device to discover devices present in a defined zone of influence;
Discovery_Ack, which makes it possible for a device to respond to a discovery request;
Register_Request, which allows a device to search for a free device number;
Register_Noack, which makes it possible for a device to respond that the requested device number is already allocated; and
Registered, which allows a device to inform one or more other devices that it has validated its new identifier.

The Discovery_Request message is a multicast message transmitted by a device searching for other connected devices in a defined geographical zone. It takes the form:
Discovery_Request=<ID><AREA><IDDiscovery><type>
In which:
ID corresponds to the identifier of the device transmitting the message;
AREA corresponds to the geographical zone in which the transmitting device would like to carry out its search, this zone possibly being parameterized in the transmitting device;
MessID=IDDiscovery corresponds to the type of message for discovery of devices present in the zone;
Mess=<type> allows the type of device required to respond to the message to be specified. It may be every type of device. In this case, the variable <type>=0.

If necessary, the message may also be a multicast1, multicast2, or multicast3 type of message if the devices have access to information relating to their orientation, and if certain devices are targeted with respect to the zone of influence.

The response message to a Discovery_Request discovery message is of the unicast type, each device concerned by the message responding to the device that transmitted the discovery message. This message takes the form:
Discovery_Ack=<ID><ID><IDDiscovery_Ack><Area><Curpos><LocAcc>
In which:
ID corresponds to the identifier of the device required to respond to the Discovery_Request message;
ID corresponds to the identifier of the device that transmitted the Discovery_Request message;
MessID=IDDiscovery_Ack corresponds to the type of message used to inform the transmitter device that the message relates to a discovery message; and
Mess=<AREA><CurPos><LocAcc> allows the device to inform the transmitter device of its current geographical position and the accuracy of its position.

The Register_Request message allows a device to search for a free device number with a view to validating its registration. This message is of unicast type and makes it possible to check whether a given device number is already in use. The Register_Noack message is the negative response transmitted by a device in response to the Register_Request message. This is a message of the unicast type.

The Registered message corresponds to the message transmitted by a device in order to confirm the registration of its identifier.

When a new device connects to the communication network it generates its identifier by determining its reference geographical position DevPos. Initially, its identifier comprises by default a device number of zero. It must therefore determine its device number by proceeding in the following way:
the device scans device numbers ranging from 1 to n for devices of the same type having the same reference position by employing the unicast message denoted Register_Request,
each device concerned by the transmitted device number must respond with a Register_Noack message in order to signal that the device number is already allocated;
when a Register_Request message obtains no response, the device chooses the device number corresponding to the last message that it transmitted; and
the device then transmits a Registered message, of the unicast type, in order to inform each device of its new identifier.

The above procedure is also followed by a device when the latter must renew its identifier ID on receipt of a renew application message or when the difference between the current geographical position CurPos of the device and its reference geographical position DevPos becomes greater than its positional uncertainty LocAcc.

According to the invention, the communication protocol also allows conflicts of address between devices to be managed. Specifically, a number of devices may possess the same identifier at a given moment in time, including therein the same device number. This is, for example, the case when a number of devices having the same geographical coordinates connect to the communication network and seek to register at the same time. At this moment in time they therefore all possess the same device number, set to a value of zero. This is also the case when, for example, a device disconnects from the communication network then reconnects with the same identifier while, in the meantime, another device has registered in the network with the same identifier. These conflicts are resolved in a conventional way by automatic address configuration means.

Moreover, "application" messages such as described below also exist:

The message denoted Wo_Move allows a device that transmits this message to find out which devices connected to the network in a given zone have moved and when they were moved. This message is a multicast message. The message denoted Wo_Move_Ack is the response to the message Wo_Move. This message is a unicast message. As for the Discovery_Request message, the Wo_Move message may be of the "multicast1", "multicast2" or "multicast3" type if the devices have access to information relating to their orientation and if certain devices are targeted with respect to the zone of influence.

According to the invention, the communication protocol described above employing geographical-coordinate-based identifiers ID may be implemented in various applications. It has the advantage of requiring no particular configuration of the devices, except that of the one or more zones of influence of a transmitter device and optionally the incorporation of the above table defining the various values of the data item TreatZ.

In each of the applications, the transmitter device dialogs with one or more recipient devices over the communication network. Each recipient device has for example a function that can be activated depending on its geographical position with respect to the zone of influence parameterized in the transmitter device. This function may for example be a signal to transmit data or a signal to turn on a light or a request for a response to a specific message.

Two distinct operating modes may be defined. In the first operating mode, the transmitter device 10 transmits a multicast message to destination devices with which it would like to communicate in its zone of influence. In this first operating mode, the destination device may comprise means for determining its position with respect to the zone of influence of the transmitter device. If the destination device determines that its reference geographical position DevPos or its current geographical position CurPos is in the zone of influence Z1 of the transmitter device, it activates the function defined by the data items MessID and Mess of the message originating from the transmitter device. Of course, if the device comprises a number of distributed elements, it will determine if it is concerned by the message by taking the position of one of its elements into account, for example the geographical position of the electrical motor and not that of the electromechanical contactor allowing the electrical motor to be controlled.

In the second operating mode, the transmitter device 10 transmits a unicast message to each of the devices that it would like to control. In this second operating mode, the transmitter device 10 may determine itself which devices it would like to address by selecting their identifier. These recipient devices will either be present in or absent from its zone of influence Z1.

A first application may relate to a lighting system comprising a transmitter device such as a switch and a number of recipient devices each placed in control of a light. In this application, the zone of influence will for example be one or more rooms of a building. By virtue of the information relating to the reference orientation DevOri or the current orientation CurOri of the devices, it is possible to differentiate between certain devices having the same geographical position. This may be the case, for example, of two switches fitted on either side of a wall but intended to control two separate lights. In this case, definition of a zone of influence would not be enough to differentiate between them. Specifying, in the piece of information AREA, the data items AleaZ and TreatZ, makes it possible to select only the switch the reference or current orientation of which points, for example, toward the interior of the zone of influence, i.e. toward the interior of the room. Moreover, a message of the multicast3 type may be used, for example, to select any light type device that can transmit illumination in the direction of a given point defined in the message by the PtDet piece of information.

Another application may relate, for example, to the actuation of a pump depending on the level of a liquid present in a tank monitored by a gauge. It may also relate to the control of HVAC cassettes in a building using a remote control. In this case, the zone of influence of the transmitter device formed by the remote control is for example a cone in order to be able to control specifically a particular cassette. Another application may relate, for example, to the control of emergency lighting units.

It will of course be understood that it is possible, without departing from the scope of the invention, to imagine other variants and small improvements and even to envision using equivalent means.

The invention claimed is:

1. A method of communication between a first device and one or more other destination devices, implemented via a communication network, the method comprising:
   identifying each device in the communication network by a network identifier generated based on geographical coordinates of the respective device, wherein the network identifier includes a reference geographical position of the respective device, a type of the respective device, and a device number; and
   the first device transmitting a message to each destination device, the message
   conforming to a given communication protocol and comprising a first piece of information defining a zone of influence corresponding to a given geographical zone with respect to which each destination device determines whether the message is relevant to the respective device based on the reference geographical position,
   wherein the network identifier is generated by obtaining the geographical coordinates of the respective device and incorporating the geographical coordinates into the body of the network identifier that is used to identify the respective device for network routing within the communication network,
   wherein the network identifier includes only a geographical position of the respective device, a type of the respective device, and a device number.

2. The method as claimed in claim 1, wherein the respective device automatically updates the network identifier of the respective device if the geographical position of the respective device changes.

3. The method as claimed in claim 1, wherein the zone of influence is parameterized by its shape and size.

4. The method as claimed in claim 1, wherein the first piece of information comprises a data item relating to a positional uncertainty with respect to the zone of influence.

5. The method as claimed in claim 4, wherein the first piece of information comprises a data item relating to an orientation of a device with respect to the zone of influence.

6. The method as claimed in claim 4, wherein the message comprises a second piece of information relating to a given point in space with respect to which each device, to which a message is directed, determines whether the message is relevant to the respective device.

7. The method as claimed in claim 6, wherein the message comprises a third piece of information corresponding to an angular deviation with respect to orientations pointing to the given point in space.

8. The method as claimed in claim 1, wherein the communication protocol comprises a function for discovering the devices present in the zone of influence.

9. A communication system comprising:
   a first device and one or more other destination devices connected in a communication network,
   wherein each device is identified in the communication network by network identifier generated based on geographical coordinates of the respective device, wherein the network identifier includes a reference geographical position of the respective device, a type of the respective device, and a device number, and
   the first device is configured to employ a communication protocol to define a message transmitted by the first device to one or more destination devices, the message comprising a first piece of information defining a zone of influence corresponding to a given geographical zone with respect to which each destination device determines whether the message is relevant to the respective device based on the reference geographical position,
   wherein the network identifier is generated by obtaining the geographical coordinates of the respective device and incorporating the geographical coordinates into the body of the network identifier that is used to identify the respective device for network routing within the communication network, wherein the network identifier includes only a geographical position of the respective device, a type of the respective device, and a device number.

10. The system as claimed in claim 9, wherein the device automatically updates the network identifier of the respective device if the geographical position of the respective device changes.

11. The system as claimed in claim 9, wherein each network identifier comprises a piece of information corresponding to a type of device.

12. The system as claimed in claim 9, wherein each device comprises circuitry configured to configure a zone of influence for the respective device.

13. The system as claimed in claim 12, wherein the circuitry includes a human machine interface located on the device or that is connectable to the device.

14. The system as claimed in claim 9, wherein the zone of influence is parameterized by its shape and size.

* * * * *